United States Patent [19]
Mori

[11] Patent Number: 5,201,566
[45] Date of Patent: Apr. 13, 1993

[54] FRONT BODY STRUCTURE FOR VEHICLES
[75] Inventor: Takeo Mori, Toyota, Japan
[73] Assignee: Toyota Jidosha Kabushiki Kaisha, Toyota, Japan
[21] Appl. No.: 854,870
[22] Filed: Mar. 20, 1992
[30] Foreign Application Priority Data
  Mar. 25, 1991 [JP] Japan .................. 3-060430
[51] Int. Cl.$^5$ .......................... B62D 25/08
[52] U.S. Cl. .................. 296/192; 296/194; 296/203; 296/205; 296/209
[58] Field of Search ............... 296/185, 187, 192, 194, 296/203, 204, 205, 209

[56] References Cited
U.S. PATENT DOCUMENTS

| | | | |
|---|---|---|---|
| 3,044,822 | 7/1962 | Dean et al. | 296/194 |
| 3,321,235 | 5/1967 | Müller et al. | 296/204 |
| 4,669,776 | 6/1987 | Harasaki | 296/194 |
| 4,986,597 | 1/1991 | Clausen | 296/203 X |

FOREIGN PATENT DOCUMENTS

| | | | |
|---|---|---|---|
| 867059 | 2/1953 | Fed. Rep. of Germany | 296/203 |
| 3119666 | 1/1982 | Fed. Rep. of Germany | 296/203 |
| 3076 | 1/1986 | Japan | |

Primary Examiner—Johnny D. Cherry
Assistant Examiner—Andrew C. Pike
Attorney, Agent, or Firm—Cushman, Darby & Cushman

[57] ABSTRACT

A front body structure for vehicles comprises a side sill formed by a first frame and a second frame each having closed cross sections, wherein the first frame is curved upwardly and is further curved inwardly in a transverse direction of a vehicle body so as to form a cowl front portion and the second frame is curved inwardly in the transverse direction of the vehicle body so as to form a dash cross portion, and a front side frame which bifurcates into two bifurcated portions in a vicinity of a front side portion of the vehicle body. The first and second frames are respectively joined to end portions of the bifurcated portions, substantially even therewith. An end portion of a lower bifurcated portion of the front side frame is joined without offset to the dash cross portion. An end portion of an upper bifurcated portion of the front side frame is joined without offset to the cowl front portion. Consequently, load inputted to the front frame can be received by the side sill via the first and second frames. The load can thereby be efficiently transferred to the side sill.

18 Claims, 5 Drawing Sheets

FRONT BODY STRUCTURE FOR VEHICLES

BACKGROUND OF THE INVENTION

1. Field of the Invention

The present invention relates to a front body structure for vehicles such as automobiles.

2. Description of the Related Art

Conventional front body structures for vehicles such as automobiles include, as shown in FIG. 4, front side members 72 running along a lengthwise direction of a vehicle body and located respectively in vicinities of both ends of a front body 70 in the transverse direction of the vehicle body. A front end lower portion 72A of the front side member 72 is joined via a mount 76 to a front end portion 74A of a subframe 74 which supports an engine, a suspension, and the like. Further, a rear end portion 74B of the subframe 74 is joined to a lower part of a dash lower cross member 78 via a mount 80. Incidentally, Japanese Utility Model Application Laid-Open No. 61-3076 Official Gazette discloses an example of related conventional art.

However, with this type of front body structure for vehicles, as shown in FIG. 5, a rear end portion of the front side member 72 has an extension 72B extending downward in a vertical direction of the vehicle body. This extension 72B retains a dash panel 82 and is joined to the dash lower cross member 78. In other words, as shown in FIG. 4, the front side member 72 and the dash lower cross member 78 are offset in the vertical direction of the vehicle body. The offset amount P in the vertical direction of the vehicle body between an axis 73 of the front side member 72 and an axis 79 of the dash lower cross member 78 becomes large. As a result, the load inputted to the front side member 72, in particular, the load in the lengthwise direction of the vehicle body, is not sufficiently transmitted to the dash lower cross member 78. Consequently, a situation results in that the load inputted to the front side member 72 cannot be efficiently transmitted via the dash lower cross member 78 to a side sill 84 whose front end is joined to the dash lower cross member 78.

Further, with this conventional front body structure for a vehicle, the rear end portion 74B of the subframe 74 is joined to a lower portion of the dash lower cross member 78. Accordingly, the rear end portion 74B of the subframe 74 is offset toward the bottom with respect to the dash lower cross member 78. Consequently, the load inputted to the subframe 74, in particular, the load in the lengthwise direction of the vehicle body, is not sufficiently transmitted to the dash lower cross member 78. As a result, a situation arises in that the load inputted to the subframe 74 cannot be efficiently transmitted to the side sill 84 via the dash lower cross member 78.

SUMMARY OF THE INVENTION

In view of the aforementioned, the object of the present invention is to provide a front body structure for vehicles which is capable of efficiently transmitting a load applied to a front part of a vehicle body to a side sill.

The present invention is characterized by being comprised of a front side frame provided in a vicinity of a side portion of a front portion of a vehicle body and gradually bifurcated, from a front side in a lengthwise direction of the vehicle body, to a rear side in the lengthwise direction of the vehicle body, into an upper bifurcated portion and a lower bifurcated portion, a first frame having a closed cross-sectional structure extending in the lengthwise direction of the vehicle body and forming a portion of a side sill, a front portion of the first frame curved toward an upper side in a vertical direction of the vehicle body and further curved toward an inner side in a transverse direction of the vehicle body so as to form a cowl front member, the above-mentioned upper bifurcated portion being joined to the cowl front member, form the front side in the lengthwise direction of the vehicle body, so as to be substantially horizontal to and even with the cowl front member, and a second frame having a closed cross-sectional structure extending in the lengthwise direction of the vehicle body and forming the side sill together with the first frame, a front portion of the second frame curves toward the inner side in the transverse direction of the vehicle body so as to form a dash cross member, the above-mentioned lower bifurcated portion being joined to the dash cross member, from the front side in the lengthwise direction of the vehicle body, so as to be substantially horizontal to and even with the dash cross member.

The upper bifurcated portion of the front side frame is joined to the first frame, which forms the cowl front member, from the front side in the lengthwise direction of the vehicle body, so as to be substantially horizontal to and even with the cowl front member. Accordingly, there is no offset in the vertical direction of the vehicle body at a portion where the upper bifurcated portion of the front side frame and the cowl front member are joined. As a result, the load applied to the front side frame, especially load in the lengthwise direction of the vehicle body, can be efficiently transmitted to the first frame. The load applied to the front part of the vehicle body can thereby be efficiently transmitted to the side sill.

Further, according to the present invention, the lower bifurcated portion of the front side frame is joined, from the front side in the lengthwise direction of the vehicle body, to this second frame substantially horizontal to and even with the second frame, the second frame having a closed cross-sectional structure extending in the lengthwise direction of the vehicle body, forming the side sill together with the first frame, and being curved toward the inner side in the transverse direction of the vehicle body so as to form a dash cross member. Accordingly, there is no offset in the vertical direction of the vehicle body at the portion where the lower bifurcated portion of the front side frame and the dash cross member are joined. Consequently, load applied to the front side frame, especially load in the lengthwise direction of the vehicle body, can be efficiently transmitted to the second frame. The load applied to the front part of the vehicle body can thereby be efficiently transmitted to the side sill.

The present invention with the structure described above has a superior result in that the load applied to the front part of the vehicle body can be efficiently transmitted to the side sill.

DESCRIPTION OF THE PREFERRED EMBODIMENTS

An embodiment of the present invention will be described with reference to FIGS. 1-3.

The arrows shown in the figures designate respective directions: the FR arrow designates a front side in a lengthwise direction of the vehicle body, the IN arrow designates an inner side in a transverse direction of the vehicle body, and the UP arrow designates an upper side in a vertical direction of the vehicle body.

Figure 1:
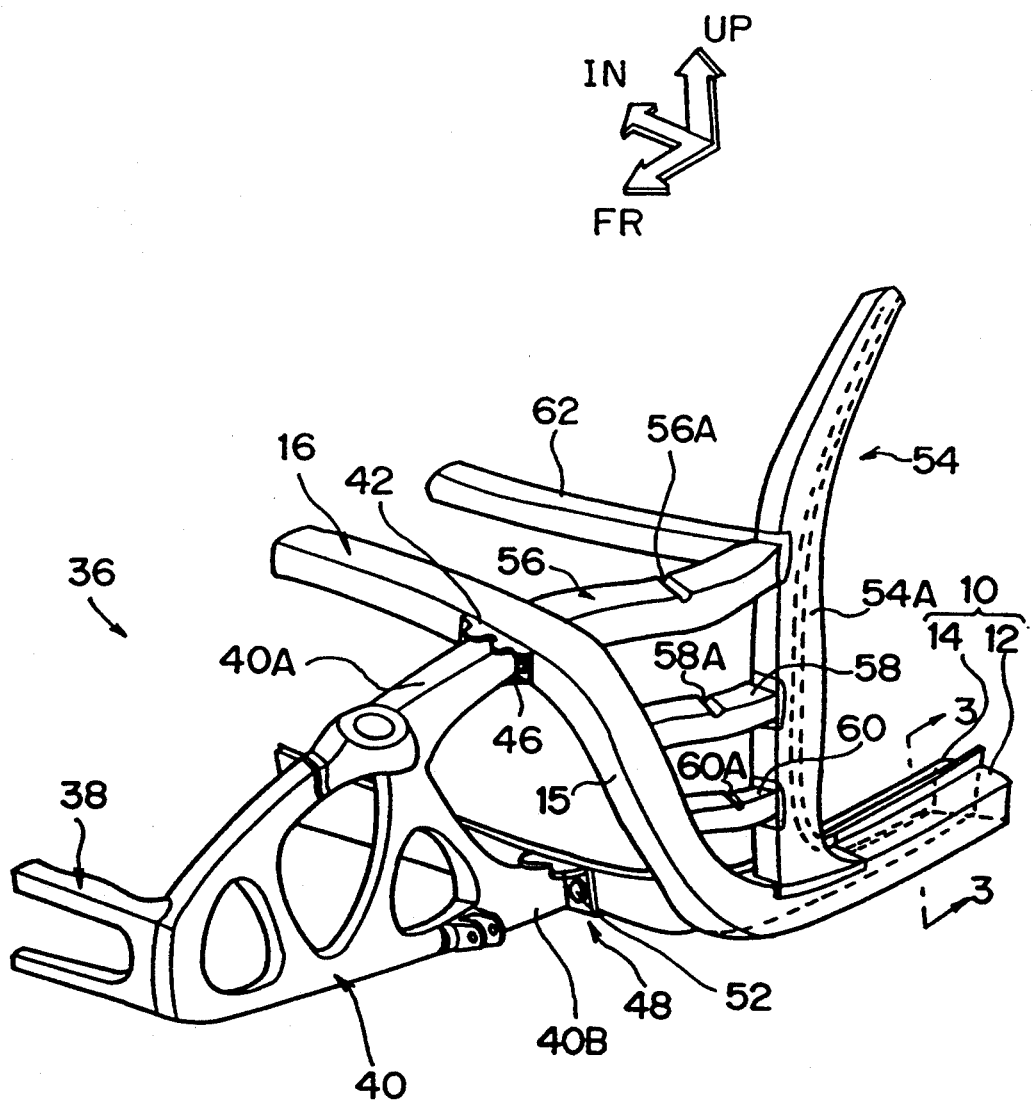
FIG. 1 is a perspective view showing an embodiment of a front body structure for vehicles of the present invention as seen from a front external view in the lengthwise direction of a vehicle body.

As shown in FIG. 1, a side sill 10 is disposed along the lengthwise direction of the vehicle body at the outer edge portion, in the transverse direction of the vehicle, at the lower portion of the vehicle body. The side sill 10 is formed by a first frame 12, which forms the outer side portion, in the transverse direction of the vehicle body, of the side sill 10, and a second frame 14, which forms the inner side portion, in the transverse direction of the vehicle body, of the side sill 10.

Figure 3:
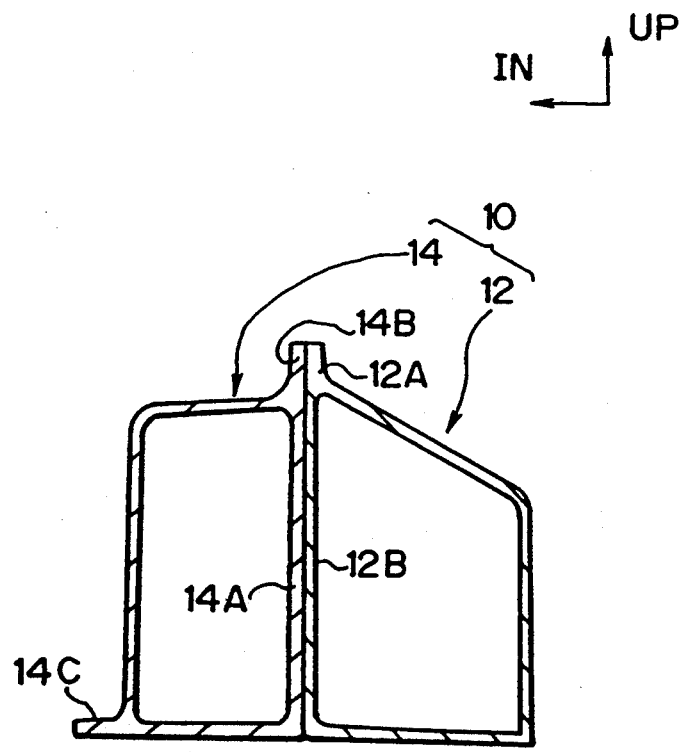
FIG. 3 is a cross-sectional view taken along line 3—3 of FIG. 1.
Figure 4:
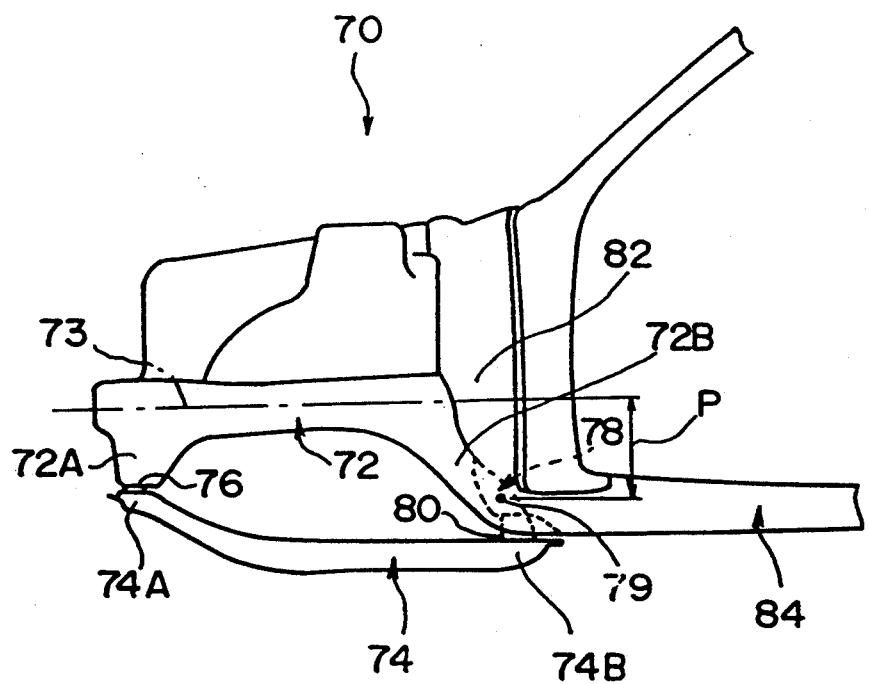
FIG. 4 is a schematic side view showing an example of a conventional front body structure for vehicles.
Figure 5:
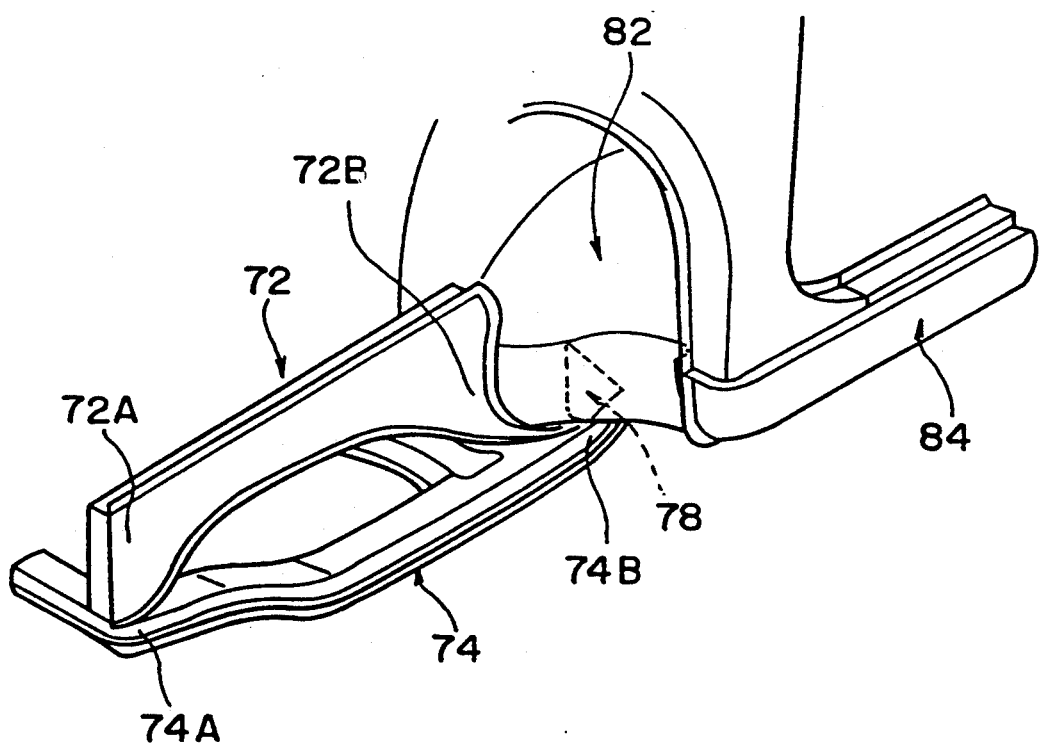
FIG. 5 is a perspective view showing the example of the conventional front body structure for vehicles as viewed from a front external view in the lengthwise direction of a vehicle body.

As shown in FIG. 3, the first frame 12 is formed of aluminum extrusions and is a closed structure whose cross section is substantially rectangular in structure. On an upper end portion of the inner side, in the transverse direction of the vehicle body, of the first frame 12, a flange 12A, directed toward the upper side in the vertical direction of the vehicle, is formed. Further, on the inner side in the transverse direction of the vehicle body of the first frame 12, the second frame 14 is disposed along the first frame 12. An outer side surface 14A, in the transverse direction of the vehicle body, of the second frame 14 contacts an inner side surface 12B, in the transverse direction of the vehicle body, of the first frame 12. This second frame 14 is formed of aluminum extrusions and is a closed structure whose cross section is rectangular in structure. On an upper end portion, of a side in the transverse direction of the vehicle body, a flange 14B, directed toward the upper side in the vertical direction of the vehicle body, is formed. This flange 14B is joined, from the inner side in the transverse direction of the vehicle body, to the flange 12A of the first frame 12. The side sill 10 is thereby formed by the first frame 12 and the second frame 14 into a double, closed cross-sectional structure. Further, at a lower end portion, in the vertical direction of the vehicle body, of the second frame 14, a flange 14C is formed and directed toward the inner side in the transverse direction of the vehicle body.

Figure 2:
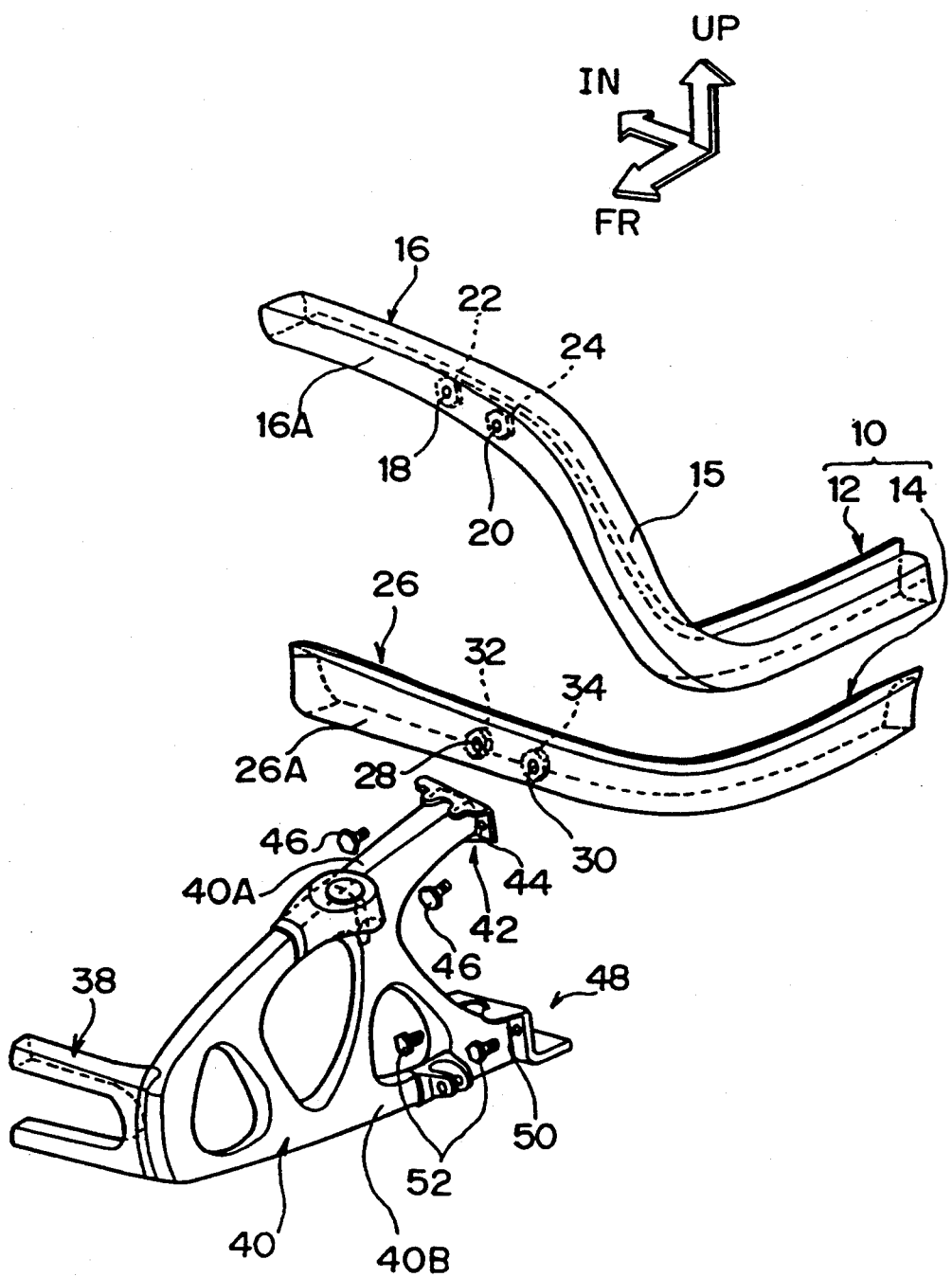
FIG. 2 is an exploded perspective view of main members of FIG. 1.

As shown in FIG. 2, the front portion (that portion heading in the forward direction) of the first frame 12 is curved upward in the vertical direction of the vehicle body to form a cowl side member 15. The upper portion of the cowl side member 15 is curved toward the inner side in the transverse direction of the vehicle body to form a cowl front member 16. In the vicinity of a side of the end portion in the transverse direction of the vehicle body of a front wall portion 16A, in the lengthwise direction of the vehicle body, of the cowl front member 16, a pair of through-holes 18, 20, spaced apart in the transverse direction of the vehicle body, is formed. On a rear side surface, in the lengthwise direction of the vehicle body, of the front wall portion 16A of the cowl front member 16, nuts 22, 24 are fixed coaxially with the through-holes 18, 20. Additionally, the front portion of the second frame 14 is curved toward the inner side in the transverse direction of the vehicle body to form a dash cross member 26. In the vicinity of a side of the end portion in the transverse direction of the vehicle body of a front wall portion 26A, in the lengthwise direction of the vehicle body, of the dash cross member 26, a pair of through-holes 28, 30, spaced apart in the transverse direction of the vehicle body, is formed. On a rear side surface, in the lengthwise direction of the vehicle body, of the front wall portion 26A of the dash cross member 26, nuts 32, 34 are fixed coaxially with the through-holes 28, 30.

As shown in FIG. 1, a front side frame 40 is disposed at the outer side, in the transverse direction of the vehicle body, of a front portion of a front body 36. An engine, suspension, and the like, which are omitted from the drawings, are mounted to this front side frame 40. Further, an end, in the transverse direction of the vehicle body, of a front cross member 38 is joined to a front end of the front side frame 40. The front side frame 40 is gradually bifurcated, from the front side in the lengthwise direction of the vehicle body toward the rear side in the lengthwise direction of the vehicle body, and in the vertical direction of the vehicle, to form an upper support portion 40A and a lower support portion 40B.

As shown in FIG. 2, at the rear side in the lengthwise direction of the vehicle body, a bracket 42 is fixed to a rear end portion of the upper support portion 40A of the front side frame 40. Both ends of the bracket 42 extend in the transverse direction of the vehicle body, and each has a flange portion through which a through-hole 44 is respectively formed. Further, the rear end portion of the upper support portion 40A contacts, from the front side in the lengthwise direction of the vehicle body, the front wall portion 16A, in the lengthwise direction of the vehicle body, of the cowl front member 16 substantially horizontally via the bracket 42. Bolts 46 are respectively inserted into each of the through-holes 44 from the front side in the lengthwise direction of the vehicle body. The bolts 46 are threaded respectively into the nuts 22, 24 of the cowl front member 16. The upper support portion 40A of the front side frame 40 is thereby joined to the cowl front member 16 by the bolts 46 and the nuts 22, 24.

A bracket 48 is fixed, at the rear side in the lengthwise direction of the vehicle body, to a rear end portion of the lower support portion 40B of the front side frame 40. Both ends in the transverse direction of the vehicle, of the bracket 48, extend in the transverse direction of the vehicle body, respectively, and each has a flange portion through which a through-hole 50 is respectively provided. Further, the lower support portion 40B contacts, from the front side in the lengthwise direction of the vehicle body, the front wall portion 26A of the dash cross member 26 substantially horizontally via the bracket 48. Bolts 52 are inserted into each of the throughholes 50 from the front side in the lengthwise direction of the vehicle body. The bolts 52 are threaded into the nuts 32, 34 of the dash cross member 26, respectively. The lower support portion 40B of the front side frame 40 is thereby joined to the dash cross member 26 by the bolts 52 and the nuts 32, 34.

As shown in FIG. 1, a lower portion 54A of a front pillar 54, which is a closed cross-sectional structure extending in the vertical direction of the vehicle body, is joined to the side sill 10, from the upper side in the vertical direction of the vehicle, in the vicinity of the point of bifurcation of the first frame 12 and the second frame 14 of the front portion of the side sill 10. A side member upper 56 is provided substantially horizontal between the lower portion 54A of the front pillar 54 and an area where the cowl front member 16 and the upper support portion 40A of the front side frame 40 are joined. The side member upper 56 has a closed cross-sectional structure formed of aluminum extrusions. Both ends of the side member upper 56 in the longitudinal direction thereof are fixed to the upper end portion of the lower portion 54A of the front pillar 54 and the cowl front member 16, respectively. Further, a side member center 58, which is substantially parallel to the side member upper 56 and has the same structure as the side member upper 56, is provided therebelow. The side member center 58 is connected to the lower portion 54A of the front pillar 54 and to the cowl side member 15. In addition, a side member under 60, which is substantially parallel to the side member center 58 and has the same structure as the side member upper 56, is provided below the side member center 58. The side member under 60 is connected to the lower portion 54A of the front pillar 54 and to the cowl side member 15. Further, the substantially middle sections, in the longitudinal direction, of the side member upper 56, the side member center 58, and the side member under 60, are respectively provided with notches 56A, 58A, and 60A. To change the fully plastic moment weight of the side member upper 56, the side member center 58, and the side member under 60, the size of each of their cross-sections may be changed, or their materials may be changed. A cowl reinforcement 62, shaped longitudinally in the transverse direction of the vehicle body, connects the front pillar 54 to the front pillar 54 located at the opposite side of the vehicle, at the top end portions of the lower portions 54A of the front pillars 54.

The operation of the embodiment will now be explained.

According to the present embodiment of the front body structure for vehicles, the front side frame 40, which is provided in the front body 36 of the vehicle, is gradually bifurcated toward the rear side in the lengthwise direction of the vehicle body into the upper support portion 40A and the lower support portion 40B. The upper support portion 40A is joined, from the front side in the lengthwise direction of the vehicle body, substantially horizontal to the first frame 12, which forms the outer side portion in the transverse direction of the vehicle body of the side sill 10 and also has a closed cross-sectional structure forming the cowl front member 16.

Accordingly, the portion where the upper support portion 40A of the front side frame 40 and the cowl front member 16 are joined has no offset in the vertical direction of the vehicle body. The upper support portion 40A contacts the cowl front member 16, with an end surface of the upper support portion 40A, substantially perpendicular to an axis of the cowl front member 16. Therefore, load applied to the front side frame 40, especially load in the lengthwise direction of the vehicle body, can be efficiently transmitted to the first frame 12. Load applied to the front side frame 40 of the front part of the vehicle body can be efficiently transmitted to the side sill 10.

Further, according to this embodiment of the front body structure for vehicles, the lower support portion 40B of the front side frame 40 is joined, from the front side in the lengthwise direction of the vehicle body, substantially horizontal to the second frame 14, which forms the inner side portion in the transverse direction of the vehicle body of the side sill 10 and is also a closed cross-sectional structure forming the dash cross member 26.

Accordingly, the portion where the lower support portion 40B of the front side frame 40 and the dash cross member 26 are joined has no offset in the vertical direction of the vehicle body. The lower support portion 40B contacts the dash cross portion 26, with an end surface of the lower support portion 40B, substantially perpendicular to an axis of the dash cross portion. Therefore, load applied to the front side frame 40, especially load in the lengthwise direction of the vehicle body, can be effectively transmitted to the second frame 14. Load applied to the front side frame 40 of the front part of the vehicle body can be effectively transmitted to the side sill 10. In addition, it is preferable that the pitch between a connecting portion of the front side frame 40 and the cowl front member 16 and a connecting portion of the front side frame 40 and the dash cross member 26 be 500 mm to 600 mm. This value varies depending on the type of vehicle. Rigidity of the frame with respect to vertical input increases when the above-mentioned connecting portions are set at the above pitch.

Moreover, in this embodiment, the side member upper 56, the side member center 58, and the side member under 60 are provided between the cowl side member 15 of the first frame 12 and the lower portion 54A of the front pillar 54 so that a fully plastic moment weight is made substantially inversely proportionate at a distance from the lower portion 54A of the front pillar 54. Therefore, when load is applied to the front side frame 40 from the front side in the lengthwise direction of the vehicle body, the load buckles the side member upper 56, the side member center 58, and the side member under 60 in that order. As a result, the energy of the load applied from the front side in the lengthwise direction of the vehicle body can be sufficiently absorbed by the side member upper 56, the side member center 58, and the side member under 60. Deformation of the front pillar 54 toward the rear can thereby be made smaller.

Incidentally, although in the embodiment described above the first frame 12 and the second frame 14 are both formed of aluminum extrusions, materials for forming the first frame 12 and the second frame 14 are not limited to aluminum extrusions; other materials may also be used.

What is claimed is:

1. A front body structure for vehicles comprising:
    a first frame having a closed cross-sectional structure extending in a lengthwise direction of a vehicle body and forming a part of a side sill, said first frame curving at a front portion of said first frame toward an upper side in a vertical direction of the vehicle body and again curving at a front portion of said first frame toward an inner side in a transverse direction of the vehicle body to form a cowl front portion;
    a second frame having a closed cross-sectional structure extending in the lengthwise direction of the vehicle body and forming together with said first frame the side sill, said second frame curving at a front portion of said second frame toward the inner side in the transverse direction of the vehicle body to form a dash cross portion; and a front side frame provided in a vicinity of a side portion of a front portion of the vehicle body and bifurcated, from a front side in the lengthwise direction of the vehicle body toward a rear side in the lengthwise direction of the vehicle body, into an upper bifurcated portion and a lower bifurcated portion, said upper bifurcated portion joining said cowl front portion from the front side in the lengthwise direction of the vehicle body so as to be substantially horizontal to and even with said cowl front portion, said lower bifurcated portion joining said dash cross portion from the front side in the lengthwise direction of the vehicle body so as to be substantially horizontal to and even with said dash cross portion.

2. A front body structure according to claim 1, wherein said front side frame is gradually bifurcated, toward the rear side in the lengthwise direction of the vehicle body, into said upper bifurcated portion and said lower bifurcated portion.

3. A front body structure according to claim 1, wherein said dash cross portion of said second frame is formed with a height approximately equal to a portion of said second frame forming said side sill.

4. A front body structure according to claim 1, wherein said first and second frames have substantially rectangular cross sections.

5. A front body structure according to claim 1, wherein portions, of said first and second frames, which form said side sill are joined together.

6. A front body structure according to claim 1, wherein said upper bifurcated portion contacts said cowl front portion, with an end surface of said upper bifurcated portion, substantially perpendicular to an axis of said cowl front portion, and said lower bifurcated portion contacts said dash cross portion, with an end surface of said lower bifurcated portion, substantially perpendicular to an axis of said dash cross portion.

7. A front body structure according to claim 1, wherein said upper bifurcated portion is joined via a bracket to said cowl front portion, at an end surface of said upper bifurcated portion, substantially perpendicular to an axis of said cowl front portion, and said lower bifurcated portion is joined via a bracket to said dash cross portion, at an end surface of said lower bifurcated portion, substantially perpendicular to an axis of said dash cross portion.

8. A front body structure according to claim 1, wherein said first and second frames are formed of aluminum extrusions.

9. A front body structure according to claim 1, further comprising:
a front pillar extending in the vertical direction of a vehicle, said front pillar having a closed cross-sectional structure, a lower end portion of which is joined to said side sill; and
at least one side member spanning between said cowl front portion and said front pillar.

10. A front body structure according to claim 9, wherein said side member is provided with a notch in a substantially central portion of said side member.

11. A front body structure for vehicles comprising:
a first frame having a closed cross-sectional structure extending in a lengthwise direction of a vehicle body and forming a portion of a side sill, said first frame curving at a front portion of said first frame a first time toward an upper side in a vertical direction of the vehicle body, a portion of said first frame more forward than a portion which curves the first time curving a second time toward an inner side in a transverse direction of the vehicle body, and a portion of said first frame located more inwardly in the transverse direction of the vehicle body from the second curve thus forming a cowl front portion;

a second frame having a closed cross-sectional structure extending in the lengthwise direction of the vehicle body and joined to said first frame so as to form the side sill, said second frame curving at a front portion of said second frame toward the inner side in the transverse direction of the vehicle body, and a portion of said second frame located more inwardly in the transverse direction of the vehicle body than a curved portion forming a dash cross portion; and a front side frame provided in a vicinity of a side portion of a front portion of the vehicle body and gradually bifurcated, from a front side in the lengthwise direction of the vehicle body toward a rear side in the lengthwise direction of the vehicle body, into an upper bifurcated portion and a lower bifurcated portion, said upper bifurcated portion joining said cowl front portion, from the front side in the lengthwise direction of the vehicle body, so as to be substantially horizontal to and even with said cowl front portion, and said lower bifurcated portion joining said dash cross portion, from the front side in the lengthwise direction of the vehicle body, so as to be substantially horizontal with said dash cross portion.

12. A front body structure according to claim 11, wherein said dash cross portion of said second frame is formed with a height approximately equal to a portion of said second frame forming said side sill.

13. A front body structure according to claim 11, wherein said first and second frames are substantially rectangular cross sections.

14. A front body structure according to claim 11, wherein said upper bifurcated portion contacts said cowl front portion, with an end surface of said upper bifurcated portion, substantially perpendicular to an axis of said cowl front portion, and said lower bifurcated portion contacts said dash cross portion, with an end surface of said lower bifurcated portion, substantially perpendicular to an axis of said dash cross portion.

15. A front body structure according to claim 11, wherein said upper bifurcated portion is joined via a bracket to said cowl front portion, at an end surface of said upper bifurcated portion, substantially perpendicular to an axis of said cowl front portion, and said lower bifurcated portion is joined via a bracket to said dash cross portion, at an end surface of said lower bifurcated portion, substantially perpendicular to an axis of said dash cross portion.

16. A front body structure according to claim 11, wherein said first and second frames are formed of aluminum extrusions.

17. A front body structure according to claim 11, further comprising:
a front pillar extending in the vertical direction of the vehicle body and having a closed cross-sectional structure, a lower end portion of said front pillar being joined to said side sill; and
at least one side member spanning between said cowl front portion and said front pillar.

18. A front body structure according to claim 17, wherein said side member is provided with a notch in a substantially central portion of said side member.

* * * * *